United States Patent [19]

Spraker, Jr.

[11] Patent Number: 4,840,036
[45] Date of Patent: Jun. 20, 1989

[54] AIR CYCLE REFRIGERATION SYSTEM

[75] Inventor: Wilbur A. Spraker, Jr., Indianapolis, Ind.

[73] Assignee: Household Manufacturing, Inc., Prospect Heights, Ill.

[21] Appl. No.: 58,927

[22] Filed: Jun. 5, 1987

[51] Int. Cl.$^4$ .............................................. F25D 9/00
[52] U.S. Cl. ......................................... 62/172; 62/402
[58] Field of Search ........................... 62/87, 402, 172

[56] References Cited

U.S. PATENT DOCUMENTS

| | | | |
|---|---|---|---|
| 2,628,482 | 2/1953 | Burgess | 62/172 |
| 3,877,246 | 4/1975 | Schutze | 62/402 |
| 4,334,411 | 6/1982 | Payne | 62/86 |
| 4,503,683 | 3/1985 | Wieland et al. | 62/86 |
| 4,535,606 | 8/1985 | Rannenberg | 62/402 |

Primary Examiner—William E. Wayner
Attorney, Agent, or Firm—Woodard, Emhardt, Naughton Moriarty & McNett

[57] ABSTRACT

An air cycle refrigeration system which comprises an air-to-air heat exchanger, first and second turbochargers, and first and second ejector pumps. The system air to be cooled is passed through the heat exchanger and into a first turbine, cooling upon expansion and driving the coupled first compressor. The system air passes from the first turbine to the second turbine, again cooling upon expansion and driving the coupled second compressor. Each compressor is connected with the coolant air outlet of the heat exchanger and draws the coolant air therefrom. The high pressure air produced from the outlets of the compressors are used to drive corresponding ejector pumps. The ejector pumps are connected with the coolant air outlet of the heat exchanger and draw additional air therefrom. The total draw of coolant air through the heat exchanger therefore comprises the total of the inlet air to the two compressors and the induced air drawn from the heat exchanger by the two ejector pumps.

9 Claims, 1 Drawing Sheet

AIR CYCLE REFRIGERATION SYSTEM

Background of the Invention

1. Field of the Invention

The present invention relates generally to air cycle refrigeration systems, and more particularly to turbine-driven air cycle systems used to provide pressurized cooling air.

2. Description of the Prior Art

Air cycle air conditioning systems are well known and commonly used for cooling and pressurizing compartments such as passenger cabins in commercial and military aircraft. One reason for the popularity of such systems is the substantial amount of cooling available from air cycle systems of relatively modest size. Another reason for the popularity of such systems has been the adaptability thereof to gas turbine engine powered vehicles, the compressor discharge section of the gas turbine engine providing a convenient source of pressurized refrigerant air for the air conditioning system.

The air cycle refrigeration system is commonly used when it is desired to produce refrigerated air from a source of high temperature-high pressure air. In such a system, the high pressure-high temperature air passes first through a heat exchanger and then through a turbine. The temperature of the air is first reduced by passing through the heat, exchanger and further reduced by passing through the turbine which produces power. The turbine output power is used to drive a fan which draws atmospheric air through the other side of the heat exchanger, thus supplying the cooling for the inlet air of the turbine. The heat and power balances of these systems require that the cooling air supply to the heat exchanger be much larger than the high pressure air supply to the turbine.

The performance of typical turbomachinery is such that a turbine driving a compressor or fan on the same shaft at the same rotational speed will handle approximately the same flow rate. The air cycle system requirement for a cooling air flow rate many times the turbine flow rate therefore results in a basic imbalance of the performance characteristics of the turbine and the compressor or fan. Currently available equipment for an air cycle system is therefore highly specialized. derived from aircraft gas turbine practice, and is complex and expensive.

One type of conventional cooling turbines used to supply pressurized cooling air to aircraft cabins comprises three primary elements —a fan impeller, a turbine wheel, and a compressor impeller —mounted on a common drive shaft. During operation of the machine, compressor bleed air from the aircraft's engine is forced through a first heat exchanger positioned in a ram air duct and then into the inlet of the air cycle machine compressor. The compressed bleed air discharged from the machine's compressor is flowed through a second heat exchanger in the ram air duct, through a conventional dehumidifying system, and then into and through the turbine, thereby rotationally driving the turbine and, via the common drive shaft, the compressor and fan. Finally, the expanded and cooled air discharged from the turbine is flowed into the aircraft cabin as environmental control cooling air.

The fan impeller and a portion of the driveshaft are positioned within the ram air duct downstream from the first and second heat exchangers, while the compressor and turbine sections and the remainder of the shaft project outwardly of the duct. As the fan is rotationally driven by the turbine it draws ambient air into the inlet end of the ram air duct, across the heat exchangers and the fan itself, and then discharges the air outwardly through the outlet end of the duct. In this manner the turbine-driven fan provides both an additional load for the turbine and a continuous ambient air flow across the heat exchangers to cool the two bleed air streams being flowed therethrough.

In U.S. Pat. No. 4,503,683 issued to Wieland et al. on Mar. 12, 1985, there is disclosed a similar air cycle refrigeration system which utilizes a three wheel air cycle cooling machine having a fan mounted between a turbine and compressor on a common drive shaft. The fan is positioned between two series-mounted heat exchangers mounted in a ram air duct and used to cool hot engine bleed air which drives the turbine.

An air cycle refrlgeration system in which cabin exhaust air is used to regeneratively cool the pressurized working fluid before expansion through a cooling turbine is disclosed in U.S. Pat. No. 4.334,411, issued to Payne on June 15, 1982. The turbine is coupled with a fan which draws air through two series heat exchangers, and the turbine discharges the air into the cabin for air conditioning purposes.

In U.S. Pat. No. 3,877,246, issued to Schutze on Apr. 15, 1975, there is disclosed an air-conditioning system for aircraft cabins which includes a turbocharger which feeds air through a heat exchanger and the to a turbine for expansion and cooling. The turbine drives a compressor which directs its discharge to a recirculation which enters the feed to the turbine upstream thereof.

An air cycle air conditioning system is described in U.S. Pat. No. 4,535,606, issued to Rannenberg on Aug. 20, 1985. The system is driven and charged by a gas turbine engine and operates in a closed-loop Brayton cycle. The system includes a main compressor discharging to a sink heat exchanger which in turn discharges to a regenerative heat exchanger. Air is ducted from the regenerative heat exchanger to an expansion turbine where the air is chilled and then ducted to a load. such as the cabin. Air exhausted from the load is again ducted through the regenerative heat exchanger where the load exhaust air pre-cools turbine inlet air. The capacity of and input power to the system are controlled by modulation of charge air provided to the system from the gas turbine engine. If desired, further control is achieved by selective bleeding of air from the system, selective bypassing of the system turbine with refrigerant, or modulation of shaft input power to the main compressor.

SUMMARY OF THE INVENTION

Briefly describing one aspect of the present invention there is provided an air cycle refrigeration system which comprises an air-to-air heat exchanger having system air inlet and outlet and coolant air inlet and outlet, a turbocharger having a turbine connected with the system air outlet for driving the turbine and a coupled compressor, the compressor having its inlet coupled with the coolant air outlet to draw air therefrom and exhaust it at high pressure the high pressure air from the compressor being directed to drive an ejector pump having a second inlet connected with the coolant air outlet of the heat exchanger. In an alternate embodiment there is included a second turbocharger, having the turbine driven by the exhaust from the first turbine, and having the high pressure from the compressor driving a second ejector pump having a second inlet connected with the heat exchanger to draw coolant air therefrom.

It is an object of the present invention to provide an air cycle refrigeration system which is simple in design and utilizes standard available components.

A further object of the present invention is to provide an air cycle refrigeration system which provides for air flow through the heat exchanger in an amount significantly above the air flow of system air to be cooled.

Further objects and advantages of the present invention will be apparent from the description of the preferred embodiment which follows.

Description of the Preferred Embodiment

Figure 1:
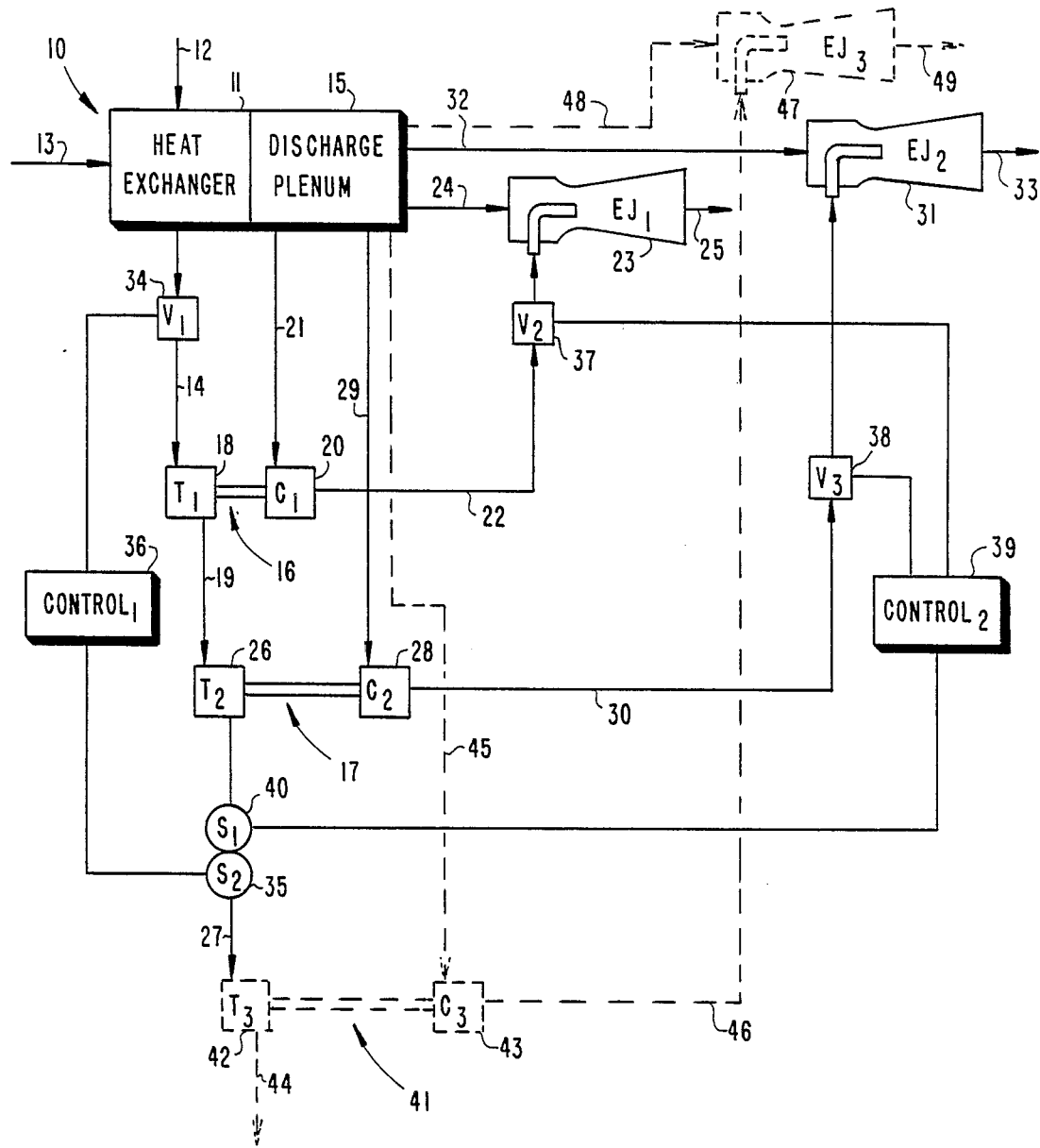
FIG. 1 is a schematic diagram showing the preferred embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention provides an air cycle refrigeration system which can utilize readily available components. The system overcomes prior art designs which typically required complex and expensive machinery. For the present invention, the system may comprise, for example, an air-to-air heat exchanger, turbochargers such as are used on heavy duty diesel engines, and air ejector pumps or the like which are widely used in the process industries.

Referring in particular to FIG. 1, there is shown a diagram of the air cycle refrigeration system 10 of the present invention. System 10 includes an air-to-air heat exchanger 11. High pressure-high temperature system air enters the heat exchanger at 12 and is cooled by atmospheric coolant air entering the heat exchanger at 13. The system air exits the heat exchanger at 14 and passes through one or more turbocharger turbines in series. Power is extracted and the temperature of the system air is further lowered in each turbine. The system is arranged such that the system air discharged from the final turbine is at a desired low temperature and is at a pressure slightly above atmospheric pressure.

The coolant air for the air-to-air heat exchanger is drawn from the atmosphere. The heat exchanger coolant air discharge consists of an air plenum 15. The turbocharger turbines drive turbocharger compressors, which operate in parallel. Each compressor draws compressor intake air from the heat exchanger discharge plenum 15, and discharges the high pressure compressor discharge air to the driving jet of an air ejector pump. The total coolant air flow to the air-to-air heat exchanger is therefore equal to the intake air of the two compressors plus the secondary flow to the two ejector pumps, each compressor driving one of the ejector pumps.

The foregoing system circumvents the flow balance problems of prior art air cycle systems. Each turbocharger compressor and turbine handles approximately the same volume flow rate of air. The additional air required for cooling is supplied by the ejector pumps which in turn are driven by high pressure discharge air from the compressors.

In the preferred embodiment, the refrigeration system 10 includes two turbochargers 16 and 17. The system air exiting the heat exchanger is directed in conventional fashion to the first turbine 18, and exits the turbine at 19. Turbine 18 is coupled with the first compressor 20. The turbine and compressor constitute a turbocharger which may have a standard design as is well known in the art. The turbocharger may be of the same type, for example, as shown in the various prior art references cited previously. The compressor 20 draws intake air 21 from the discharge plenum 15, and discharges high pressure air at 22.

The high pressure discharge 22 from the first compressor 20 is directed to drive an ejector pump 23. The ejector pump 23 may be any standard design, such as the one shown in U.S. Pat. No. 4,334,411, issued to Payne on June 15, 1982, in which driving air, such as 22 is passed through the ejector pump and acts to draw additional intake air through the pump. Ejector pump 23 draws its intake air 24 from the discharge plenum 15, and discharges the air at 25.

It will be seen that the turbocharger 18 and compressor 20 handle approximately the same flow of air, in typical fashion for standard turbocharger designs. However, the discharge air 22 from the compressor 20 is used in turn to drive the ejector pump 23, thereby providing for additional air draw 24 from the discharge plenum 15 of the heat exchanger. Consequently, the coolant air drawn from the discharge plenum, as associated with the first turbocharger and ejector pump is equal to the sum of the intake air 21 for the first compressor and the intake air 24 for the ejector pump.

In the preferred embodiment, the present invention includes a second turbocharger pair of turbine and compressor. The discharge air 19 from the first turbine 18 is directed to the second turbine 26 of the second turbocharger 16, and exits at 27. The turbine 26 is coupled with compressor 28, which draws its intake air 29 also from the discharge plenum 15. The high pressure discharge 30 from compressor 28 is in turn directed to a second ejector pump 31. Ejector pump 31 draws intake air 32 from the discharge plenum 15, and discharges air at 33.

In the foregoing embodiment employing two turbochargers 16 and 17, it will be seen that the air draw from the discharge plenum 15 comprises the intakes 21 and 29 for the two compressors, and the intakes 24 and 32 for the two ejector pumps. The sum of these four intakes significantly exceeds the air flow of the system air 12. This difference in air flows enables the system to operate without the basic flow balance problems associated with systems of the prior art.

Control of the air cycle refrigeration system 10 may require that the temperature of the refrigerated air 27 leaving the second turbine 26 be maintained at some desired set point. A direct way to accomplish this is to throttle the high temperature-high pressure supply air 14 ahead of the first turbine 18 using a throttling valve 34. Valve 34 is controlled by a suitable air temperature sensor 35 located in the discharge air stream 27 of the second turbine 26. A controller 36 monitors the discharge air temperature and in response thereto regulates the air flow 14 to the first turbine. This control mechanism will adequately control the discharge temperature, but does have the disadvantage of reducing the refrigerated air flow rate for any operating condition other than maximum system output.

An alternative control system consists of throttling the discharge air 22 and 30 from the two compressors 20 and 28, respectively. This reduces the airflow rate to the driving jets of the air ejector pumps 23 and 31. This has the effect of decreasing the coolant air flow rate through the heat exchanger by reducing the air draws 24 and 32 of the two ejector pumps. A reduction of coolant air flow through the heat exchanger results in an increase in the temperature of the inlet air 14 to the first turbine, and therefore of the final discharge air 27. Throttling valves 37 and 38 are positioned to control the air flows 22 and 30 to the ejector pumps 23 and 31, respectively. A controller 39 monitors the temperature of the discharge air flow 27 by means of a sensor 40, and regulates the throttling of the air flows 22 and 30 to the two ejector pumps by operation of the throttling valves 37 and 38.

Care must be taken with throttling the discharge air flow from the compressors so as not to reduce the flow rate to the point that the compressors will surge. The surge flow rate for the compressors will be a function of the detailed operating characteristics of the compressors and the turbines. The compressor discharge throttling valve is therefore equipped with stops so that the valves modulate between wide open and a partially closed state associated with assuring minimum flow through the compressors to avoid surging.

The preferred refrigerated air discharge temperature control system consists of a combination of the two control systems just described. The air temperature sensors 35 and 40 are located in the discharge air stream of the final turbine. A suitable valve actuator comprising the two controllers 36 and 39 initially controls the position of the throttling valves 37 and 38 in the compressor discharge lines 22 and 30. At system startup, these valves are wide open and the controller modulates their position to hold a desired refrigerated air discharge temperature as described previously. In the event that the compressor discharge air throttling valves reach their minimum flow stops, selected to ensure that the turbocharger compressors do not surge, the actuator switches to throttle the high pressure high temperature supply air 14. The supply air control valve is wide open at all times except when the compressor discharge throttling valves are at their minimum flow stops.

In a typical system, 83 pounds per minute of system air at 50.7 psia and 485° F. is available. This air enters the air-to-air heat exchanger 11 and leaves at 14 at 48.7 psia and 186° F. It enters the first turbine 18 and discharges at 27.2 psia and 107° F. and enters the second turbine 26. It leaves the second turbine at 27 at 15.2 psia and 37° F. The discharge pressure, 0.5 psi above atmosphere, is sufficient to act as the supply pressure to the system to be cooled. During this process, the first turbine produces approximately 37 horsepower and the second approximately 33 horsepower.

The heat and power balance for the system requires that 290 lbs. per minute of coolant air enter the cooling air side of the heat exchanger. The entering coolant air 12 is at 120° F. and 14.7 psia. The heat exchanger has a pressure drop of 1.5 psia. The coolant air leaving the heat exchanger is therefore at 206° F. and 13.2 psia. The turbocharger compressor 20 driven by the first turbine 18 draws 52.3 lbs. per minute from the plenum 15 and discharges at 21 psia and 332° F. The discharge 22 from the first compressor is connected to the driving jet of the air ejector 23 and induces 90.6 lbs. per minute of air 24 which is also drawn from the heat exchanger discharge plenum 15. In like manner, the compressor 28 driven by the second turbine 26 draws 56.5 lbs. per minute from the plenum 15 and discharges it at 19.3 psia and 308° F. The discharge 30 of the second compressor 28 flows to the driving jet of the second ejector 31 which draws 90.6 lbs. per minute of air 32 from the plenum 15. The primary and secondary flow from each ejector discharges to atmosphere, discharging at 14.7 psia and 249° F. The coolant air intake flow of 290 lbs. per minute is therefore seen to be supplied by the sum of the flow to the two compressors 20 and 28 plus the secondary flow induced by the two ejector pumps 23 and 31.

The performance of the system will vary as a function of the effectiveness and pressure drop of the heat exchanger, the efficiency of the two compressors and turbines, and the performance of the ejector pumps. Details of the arrangement of the system will vary with the pressure and temperature of the supply air. Supply air at higher pressure, for example, may require the use of three turbocharger turbines in series and three turbocharger compressors in parallel, whereas a lower supply pressure and temperature might allow operation of the system with a single turbocharger.

Although the preferred embodiment contemplates two turbochargers and two ejector pumps, alternative designs using one, or three or more, of these components may be used. In the case of a single turbocharger and ejector pump, the system would operate in the manner already described with respect to the turbocharger 16 and ejector pump 23. Alternatively, a third turbocharger 41 may be employed. Turbocharger 41 includes a turbine 42 and coupled compressor 43. The discharge air 27 from the second turbine 26 is directed to and drives the third turbine 42, the air being discharged at 44. The third compressor 43 draws its intake air 45 from the plenum 15, and discharges high pressure air at 46. The high pressure discharge 46 is directed to a third ejector pump 47, and operates to draw additional intake air 48 from the plenum. The ejector pump 47 discharges the air at 49. In these alternative embodiments, corresponding changes may be made in the control systems. For example, for a single turbocharger design the controller 36 would operate off of the discharge 19 of the first turbine 19, and for a three turbocharger system it would operate off of a sensor on the discharge 44 of the third turbine. Similar changes can be made in the throttling of the discharges from the compressors directed to the corresponding ejector pumps.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An air cycle refrigeration system which comprises:
   an air-to-air heat exchanger including a system air inlet and outlet and a coolant air inlet and outlet, the coolant air outlet of said heat exchanger comprising a discharge plenum;

first coupling means for coupling the system air inlet of said heat exchanger to a source of high-pressure, high temperature system air;

second coupling means for coupling the coolant air inlet of said heat exchanger to a source of coolant air;

a turbocharger including a turbine drivingly coupled to a compressor, the turbine having an inlet and an outlet, the inlet of the turbine being connected with the system air outlet of said heat exchanger, the compressor having an inlet and an outlet, the inlet of the compressor being connected with the coolant air outlet of said heat exchanger;

an ejector pump means having a first inlet connected with the compressor outlet and a second inlet connected with the coolant air outlet of said heat exchanger, said ejector pump means further including an outlet, said ejector pump means being for receiving air from the compressor outlet into the first inlet in a manner to draw additional inlet air from the coolant air outlet and through the second inlet of said ejector pump means and exhausting the air, the outlet system air from the outlet of the heat exchanger driving the turbine and being exhausted therefrom at a reduced temperature, the turbine in turn driving the compressor which draws air from the plenum of said heat exchanger, the compressor exhausting high pressure air from the compressor outlet, the high pressure air from the outlet of the compressor being directed to said ejector pump means and operating to draw additional coolant air from the plenum;

compressor outlet control means for controlling the flow of air from the outlet of the compressor to said ejector pump means, and sensor means for sensing the temperature of the air discharged through the outlet of the turbine, said compressor outlet control means being for controlling the flow of air from the outlet of the compressor to said ejector pump means in response to the sensed temperature of the air discharged through the outlet of the turbine.

2. The refrigeration system of claim 1 and which further includes turbine-inlet control means for controlling the flow of air from said heat exchanger to the turbine inlet in response to the sensed temperature of the air discharged through the outlet of the turbine.

3. An air cycle refrigeration system which comprises:
an air-to-air heat exchanger including a system air inlet and outlet and a coolant air inlet and outlet, the coolant air outlet of said heat exchanger comprising a discharge plenum;

first coupling means for coupling the system air inlet of said heat exchanger to a source of high-pressure, high temperature system air;

second coupling means for coupling the coolant air inlet of said heat exchanger to a source of coolant air;

a first turbocharger including a first turbine drivingly coupled to a first compressor, the first turbine having an inlet and an outlet, the inlet of the first turbine being connected with the system air outlet of said heat exchanger, the first compressor having an inlet and an outlet, the inlet of the first compressor being connected with the coolant air outlet of said heat exchanger;

a first ejector pump means having a first inlet connected with the first compressor outlet and a second inlet connected with the coolant air outlet of said heat exchanger, said first ejector pump means further including an outlet, said first ejector pump means being for receiving air from the first compressor outlet into the first inlet in a manner to draw additional inlet air from the coolant air outlet and through the second inlet of said first ejector pump means and exhausting the air, the outlet system air from the outlet of the heat exchanger driving the first turbine and being exhausted therefrom at a reduced temperature, the first turbine in turn driving the first compressor which draws air from the plenum of said heat exchanger, the first compressor exhausting high pressure air from the first compressor outlet, the high pressure air from the outlet of the first compressor being directed to said first ejector pump means and operating to draw additional coolant air from the plenum;

a second turbocharger including a second turbine drivingly coupled to a second compressor, the second turbine having an inlet and an outlet, the inlet of the second turbine being connected with the outlet of the first turbine, the second compressor having an inlet and an outlet, the inlet of the second compressor being connected with the coolant air outlet of said heat exchanger; and a second ejector pump means having a first inlet connected with the outlet of the second compressor and a second inlet connected with the coolant air outlet of said heat exchanger, said second ejector pump means further including an outlet, said second ejector pump means being for receiving air from the outlet of the second compressor into the first inlet in a manner to draw additional inlet air from the coolant air outlet and through the second inlet of said first ejector pump means and exhausting the air, the outlet system air from the outlet of the heat exchanger driving the first turbine and being exhausted therefrom at a reduced temperature, the exhausted air from the first turbine driving the second turbine and being exhausted therefrom at a reduced temperature, the first turbine in turn driving the first compressor and the second turbine in turn driving the second compressor, each compressor drawing air from the plenum of said heat exchanger, each of the first and second compressors exhausting high pressure air from the respective compressor outlet, the high pressure air from the outlet of the first compressor being directed to said first ejector pump means and operating to draw additional coolant air from the plenum, the high pressure air from the outlet of the second compressor being directed to said second ejector pump means and operating to draw additional coolant air from the plenum.

4. The refrigeration system of claim 3 and which further includes turbine-inlet control means for controlling the flow of air from said heat exchanger to the inlet of the turbine.

5. The refrigeration system of claim 4 and which further includes sensor means for sensing the temperature of the air discharged through the outlet of the turbine, said turbine inlet control means being for controlling the flow of air from said heat exchanger to the turbine inlet in respons to the sensed temperature of the air discharged through the outlet of the turbine.

6. The refrigeration system of claim 3 and which further includes compressor-outlet control means for controlling the flow of air from the outlet of the compressor to said ejector pump means.

7. The refrigeration system of claim 6 and which further includes turbine-inlet control means for controlling the flow of air from said heat exchanger to the inlet of the turbine.

8. The refrigeration system of claim 6 and which further includes sensor means for sensing the temperature of the air discharged through the outlet of the turbine, said compressor-outlet control means being for controlling the flow of air from the outlet of the compressor to said ejector pump means in response to the sensed temperature of the air discharged through the outlet of the turbine.

9. The refrigeration system of claim 8 and which further includes turbine inlet control means for controlling the flow of air from said heat exchanger to the turbine inlet in response to the sensed temperature of the ar discharged through the outlet of the turbine.

* * * * *